United States Patent
Miura et al.

(10) Patent No.: US 7,102,762 B2
(45) Date of Patent: Sep. 5, 2006

(54) SURFACE INSPECTION APPARATUS

(75) Inventors: Takahiro Miura, Aichi (JP); Satoshi Imaizumi, Aichi (JP)

(73) Assignee: Nidek Co., Ltd., Aichi (JP)

( * ) Notice: Subject to any disclaimer, the term of this patent is extended or adjusted under 35 U.S.C. 154(b) by 222 days.

(21) Appl. No.: 10/901,032

(22) Filed: Jul. 29, 2004

(65) Prior Publication Data
US 2005/0046866 A1 Mar. 3, 2005

(30) Foreign Application Priority Data
Jul. 31, 2003 (JP) ............................ P2003-284318

(51) Int. Cl.
*G01B 9/02* (2006.01)
(52) U.S. Cl. .................................................... 356/514
(58) Field of Classification Search ................ 356/495, 356/511–514
See application file for complete search history.

(56) References Cited

U.S. PATENT DOCUMENTS

| | | | | |
|---|---|---|---|---|
| 4,072,423 A | * | 2/1978 | Kimura et al. | 356/512 |
| 4,859,061 A | * | 8/1989 | Inoue | 356/512 |
| 5,452,088 A | * | 9/1995 | Ai | 356/514 |
| 5,488,477 A | * | 1/1996 | de Groot | 356/514 |
| 6,359,692 B1 | * | 3/2002 | Groot | 356/512 |
| 6,501,552 B1 | * | 12/2002 | Mizuno | 356/512 |
| 6,757,067 B1 | * | 6/2004 | Lee et al. | 356/512 |

FOREIGN PATENT DOCUMENTS

JP 2001-124532 A 5/2001

* cited by examiner

*Primary Examiner*—Samuel A. Turner
(74) *Attorney, Agent, or Firm*—Sughrue Mion, PLLC

(57) ABSTRACT

A surface inspection apparatus for inspecting a surface of an object to be inspected, includes: a projecting optical system which projects an inspection light to the object surface via a reference surface; a pick up unit which picks up surface interference fringes formed by reflected light from the reference surface and reflected light from the object surface; and an arithmetic unit which calculates a shape of the surface of the object based on the picked up interference fringes. The projecting optical system includes a laser light source that emits, as the inspection light, pulsed laser light having a pulse width and a pulse quiescent time capable of preventing formation of rear face interference fringes which are formed by the reflected light from the object surface and reflected light caused by the inspection light being reflected from its rear face, the object allowing the inspection light to pass therethrough.

5 Claims, 3 Drawing Sheets

SURFACE INSPECTION APPARATUS

BACKGROUND OF THE INVENTION

The present invention relates to a surface inspection apparatus for inspecting a surface of an object to be inspected.

A known surface inspection apparatus projects inspection light on a surface (hereinafter also referred to as an object surface) of an object to be inspected (test object) such as a semiconductor wafer and a glass mask via a reference surface to pick up interference (Moire) fringes formed (occurring) by reflected light from the reference surface and reflected light from the object surface using a pick up device such as a CCD camera, thereby inspecting the object surface (a shape of the object surface) based on the picked up interference fringes.

By the way, when the object allows the inspection light to pass therethrough, interference fringes (hereinafter also referred to as rear face interference fringes) are formed by the reflected light from the object surface and a reflected light from a rear face of the object, and these interference fringes cause noise (disturbance) during the inspection of the object surface.

SUMMARY OF THE INVENTION

An object of the present invention is to provide a surface inspection apparatus capable of inspecting a surface (object surface) with high accuracy by eliminating influences of rear face interference even when an object to be inspected allows inspection light to pass therethrough.

In order to solve the aforesaid object, the invention is characterized by having the following arrangement.

(1). A surface inspection apparatus for inspecting a surface of an object to be inspected, comprising:

a projecting optical system which projects an inspection light to the surface of the object via a reference surface;

a pick up unit which picks up surface interference fringes formed by reflected light caused by the inspection light being reflected from the reference surface and reflected light caused by the inspection light being reflected from the surface of the object; and an arithmetic unit which calculates a shape of the surface of the object based on the picked up interference fringes, wherein the projecting optical system includes a laser light source that emits, as the inspection light, pulsed laser light having a pulse width and a pulse quiescent time capable of preventing formation of rear face interference fringes which are formed by the reflected light from the surface of the object and reflected light caused by the inspection light being reflected from a rear face of the object, the object allowing the inspection light to pass therethrough.

(2) The surface inspection apparatus according to (1), wherein the light emitted from the laser light source is reflected from the reference surface, the surface of the object, and the rear face of the object; and the pulse width has a time length longer than a time T1 during which the inspection light travels an optical path difference which is made between the reflected light from the reference surface and the reflected light from the surface of the object when the reflected light forms the interference fringes and shorter than a time T2 during which the inspection light travels an optical path difference which is made between the reflected light from the surface of the object and the reflected light from the object rear face of the object when the reflected light forms the interference fringes.

(3) The surface inspection apparatus according to (2), wherein the pulse quiescent time is longer than the time T2 and shorter than a time length for one frame picked up by the pick up unit.

(4) A surface inspection apparatus for inspecting a surface of an object to be inspected, comprising:

a laser light source which projects inspection pulsed laser light to the surface of the object via a reference surface, wherein the laser light is emitted from the laser light source to be reflected from the reference surface, the surface of the object and a rear face of the object and has a pulse width longer than a time T1 during which the laser light travels an optical path difference which is made between the reflected light from the reference surface and the reflected light from the surface of the object when the reflected lights form interference fringes and shorter than a time T2 during which the laser light travels an optical path difference which is made between the reflected light from the surface of the object and the reflected light form the rear face of the object when the reflected lights form interference fringes;

a pick up unit which picks up the interference fringes formed by the reflected light from the reference surface and the reflected light from the surface of the object; and an arithmetic unit which calculates a shape of the surface of the object based on the picked up interference fringes.

(5) The surface inspection apparatus according to (4), wherein the laser light has a pulse quiescent time longer than the time T2 and shorter than a time length for one frame picked up by the pick up unit.

DETAILED DESCRIPTION OF PREFERRED EMBODIMENTS

Figure 1:
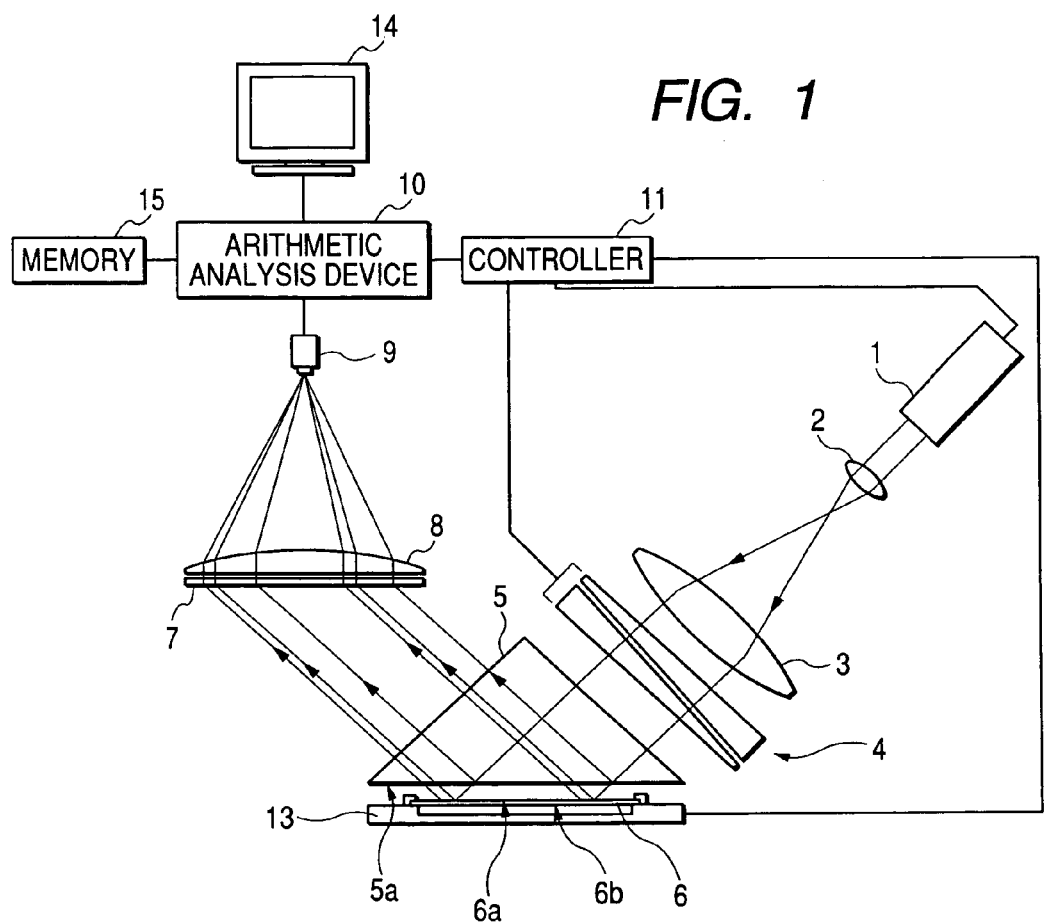
FIG. 1 is a block diagram schematically showing a grazing-incident interferometer.

One preferred embodiment according to the present invention will hereinafter be described with reference to the drawings. FIG. 1 is a block diagram schematically showing a grazing-incident interferometer which is a surface inspection apparatus.

An object 6 to be inspected is placed on a mounting table 13. Inspection light which is ultrashort pulsed laser light emitted from a laser light source 1 passes through an expander lens 2 and then is changed into parallel beams by a collimator lens 3. After that, the inspection light is made incident to a prism 5 having a reference surface 5a via a rotary prism 4. The rotary prism 4 is controlled and driven by a controller 11 to change an incident angle (projection angle) of the inspection light to the object 6. The prism 5 is disposed in such a fashion that the reference surface 5a is opposed to a surface (object surface) 6a of the object 6. A part of the inspection light made incident to the prism 5 is then reflected from the reference surface 5a to be directed toward a screen 7. The other part (the rest of beams) passes through the reference surface 5a to be reflected from the object surface 6a and then enters the prism 5 again from the reference surface 5a to be directed toward the screen 7. Thus, interference fringes are formed on the screen 7, and then the interference fringes are focused onto a pick up plane of a CCD camera 9 which is a pick up unit via a lens 8 (captured by the camera 9). Incidentally, the constitution may be so changed as to have the interference fringes directly focused on the pick up plane of the CCD camera 9 without using the screen 7. The picked up interference fringes are sent to an arithmetic analysis device 10 to be displayed on a monitor 14. The arithmetic analysis device 10 performs computing and analysis required for obtaining the shape of the object surface 6a based on the picked up interference fringes.

Figure 2:
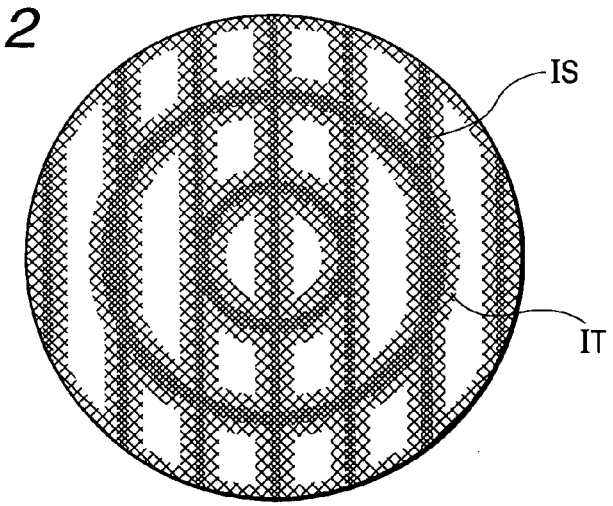
FIG. 2 is a diagram for illustrating a situation under which surface interference fringes IS and rear face interference fringes IT are formed when inspection light is continuous light.

In the case where the object 6 allows the inspection light to pass therethrough, a part of the inspection light passed through the reference surface 5a is reflected from the object surface 6a and the other part (the rest of beams) passes through the object surface 6a to be reflected from a rear face 6b of the object 6. The reflected light from the rear face 6b outgoes from the object surface 6a and then enters the prism 5 again from the reference surface 5a to be directed toward the screen 7. In the case where the inspection light is continuous light, interference fringes IS (hereinafter referred to as surface interference fringes IS) are formed by the reflected light caused by the inspection light being reflected from the reference surface 5a and the reflected light caused by the inspection light being reflected from the object surface 6a as well as interference fringes IT (hereinafter referred to as rear face interference fringes IT) are formed by the reflected light caused by the inspection light being reflected from the object surface 6a and the reflected light caused by the inspection light being reflected from the rear face 6b on the screen 7 as shown in FIG. 2. A prominence of the interference fringes IT is increased with an increase in transmittivity of the object 6. Regarding interference fringes formed by the reflected light caused by the inspection light being reflected from the reference surface 5a and the reflected light caused by the inspection light being reflected from the rear face 6b, intensity of the interference fringes formed on the screen 7 is ignorable because a difference between intensities of the reflected lights is too large.

The surface interference fringes IS are used for the inspection of the surface (object surface) 6a of the object 6. In this case, since the rear face interference fringes IT become noise, pulsed laser light having an interval which enables to form the surface interference fringes IS without forming the rear face interference fringes IT is emitted from the laser light source 1.

Figure 3:
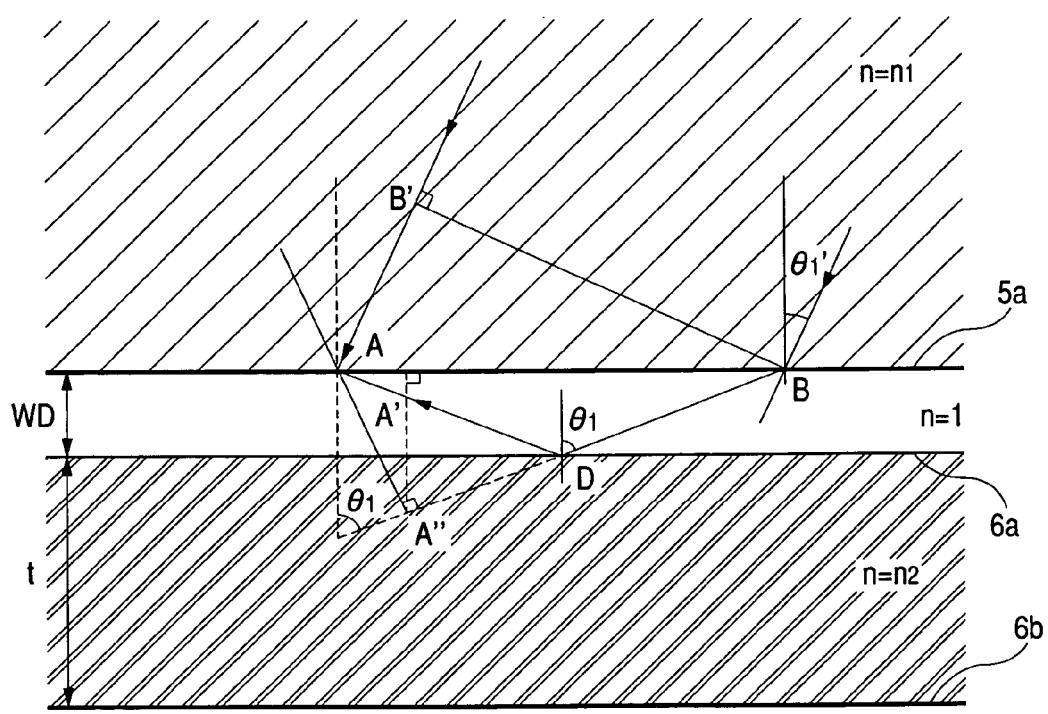
FIG. 3 is a diagram for illustrating conditions under which the surface interference fringes are formed by reflected light caused by the inspection light being reflected from a reference surface and reflected light caused by the inspection light being reflected from as surface of a test object.
Figure 4:
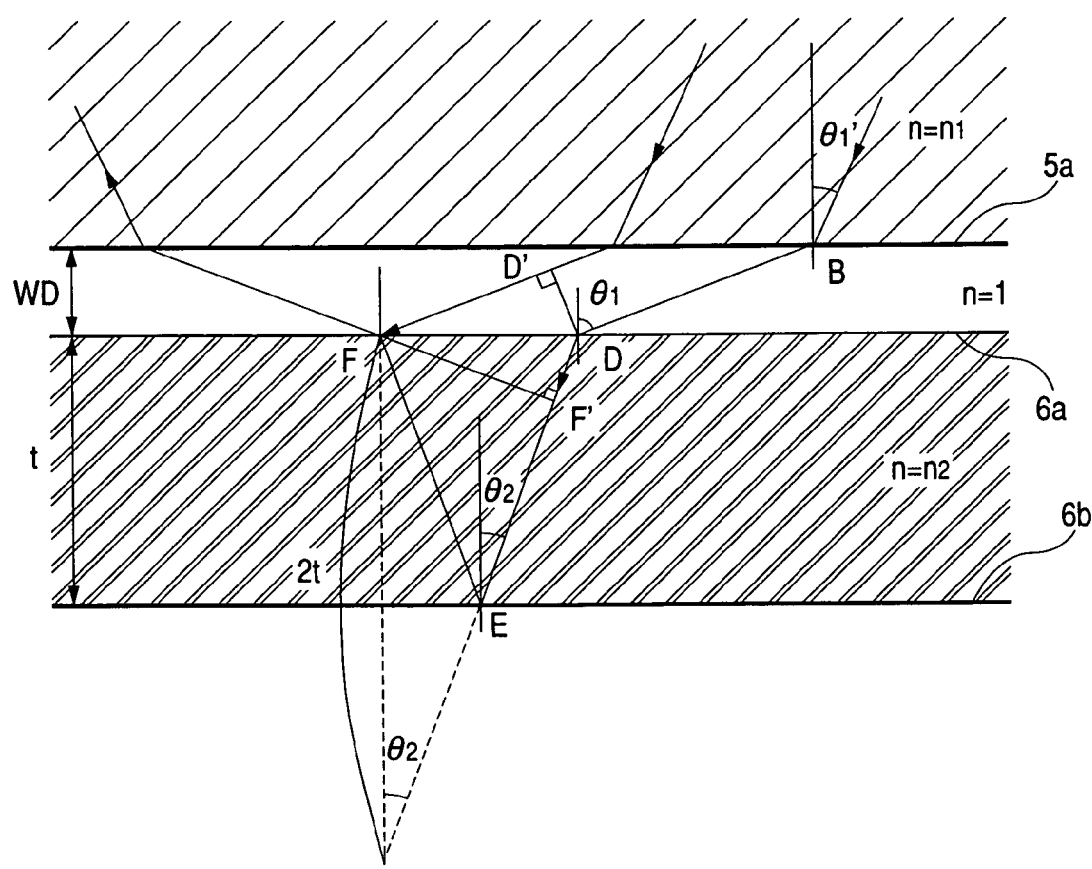
FIG. 4 is a diagram for illustrating conditions under which the rear face interference fringes IT are prevented from being formed by the reflected light caused by the inspection light being reflected from the surface of the test object and reflected light caused by the inspection light being reflected from a rear face of the test object.

Hereinafter, a method of forming the surface interference fringes IS without forming the rear face interference fringes IT will be described based on FIGS. 3 and 4. In the following description, a refraction ratio n of the prism 5 is set to n1; a refraction ratio n of the test object 6 is set to n2; an incident angle of the inspection light to the reference surface 5a is set to θ1 '; an incident angle of the inspection light to the object surface 6a after passing through the reference surface 5a is set to θ1; an incident angle of the inspection light to the rear face 6b after passing through the object surface 6a is set to θ2; a distance from the reference surface 5a to the object surface 6a is set to WD (mm); a thickness of the object 6 (a distance from the object surface 6a to the rear face 6b ) is set to t (mm); a speed of the light is set to c (m/s), and a refraction ratio n in the air is set to 1.

To start with, conditions for forming the surface interference fringes IS by the reflected light caused by the inspection light being reflected from the reference surface 5a and the reflected light caused by the inspection light being reflected from the object surface 6a will be described based on FIG. 3. A point A on the reference surface 5a is a site at which the interference between the reflected light caused by the inspection light being reflected from the reference surface Ba and the reflected light caused by the inspection light being reflected from the object surface 6a occurs. The reflected light from the object surface 6a causing the interference at the point A means the light which passes through a point B on the reference surface 5a (outgoes from the point B) after passing through the prism 5, then is reflected at a point D on the object surface 6a after passing through the air, and then reaches (enters) the point A after passing through the air. The reflected light from the reference surface 5a causing the interference at the point A means the light reflected at the point A after passing through a point B' in the prism 5. The point B' is a point at which a perpendicular line drawn from the point B intersects an optical path (light path) in the prism 5 leading to the point A, the optical path being parallel to an optical path in the prism 5 leading to the point B. A line segment BB' indicates a convergence of light which are emitted from the laser light source 1 to reach the reference surface 5a and have an identical optical path length, the line section BB' being indicated as a wave surface BB'.

Here, in the wave surface BB', a distance which the light on the point B travels during the light on the point B' travels from the point B' to the point A is obtained. When the light on the point B' reaches the point A, the light on the point B has traveled from the point B to a point A" at which the perpendicular line drawn from the point A intersects an extended line of a straight line BD under an assumption that there is no object 6. Therefore, in the case where there is the object 6, the light traveling from the point B is reflected at the point D on the object surface 6a to reach a point A'.

In terms of the optical path length, it is possible to consider that an optical path length B'A which is required for the wave surface BB' to reach the point A after passing through the point B' is identical with an optical path length BDA' which is required for the wave surface BB' to reach the point A after passing though the point B and being reflected at the point D since the lights travel the distances in an identical time length.

Next, since the refraction ratio in the air is 1, an optical path length A'A from the point A' to the point A is obtained by the following equation 1:

$$A'A = 2WD \cos \theta_1 \qquad \text{Equation 1}$$

and a time T1 required for the light to travel the optical path length A'A is obtained by the following equation 2 using the speed of light of c.

$$T1 = AA'/c \qquad \text{Equation 2}$$

Here, the following equation 3 holds.

$$\theta_1 = \sin^{-1}[n_1 \sin \theta_1'] \qquad \text{Equation 3}$$

As described above, since the time required for the light to travel the optical path length B'A is equal to the time required for the light to travel the optical path length BDA', the interference occurs when the inspection light is projected continuously for a time length longer than the time T1 which is required for the light to travel the optical path length A'A. Therefore, the condition under which the interference fringes are formed by the reflected light caused by the inspection light being reflected from the reference surface 5a and the reflected light caused by the inspection light being reflected from the object surface 6a is the continuous projection of the inspection light for the time T1 or longer. Accordingly, in order to form the surface interference fringes IS, laser light having a pulse width longer than the time T1 is projected to the object 6 (object surface 6a) via the prism 5 having the reference surface 5a.

The optical path length A'A can be represented also as an optical path difference between the optical path length BDA and the optical path length B'A or the optical path length BDA'. Further, since the wave surface BB' is the convergence of the light which are emitted from the laser light source 1 and have the identical optical path length, the optical path length A'A can be represented also as an optical path difference between the optical path length which is required for the wave surfaces of the light simultaneously emitted from the laser light source 1 and having the identical optical path length to reach the reference surface 5a and an optical path length which is required for the wave surfaces to reach the reference surface 5a after passing through the reference surface 5a and being reflected from the object surface 6a; therefore, the time T1 means the time required for the light to travel this optical path difference.

Next, the conditions for preventing the rear face interference fringes IT from being formed by the reflection light caused by the inspection light being reflected from the object surface 6a and reflection light caused by the inspection light being reflected from the rear face 6b will be described based on FIG. 4. A point F on the object surface 6a is a site at which the interference between the reflected light caused by the inspection light being reflected from the object surface 6a and the reflected light caused by the inspection light being reflected from the rear face 6b occurs. The reflected light from the rear face 6b which causes the interference at the point F is the light which passes through the point D (made incident to the point D), then is reflected from a point E after passing through the object 6 and then reaches the point F after passing through the object 6 (outgoes from the point F). The reflected light from the object surface 6a which causes the interference at the point F is the light reflected at the point F after passing through a point D' in the air. The point D' is the point at which a perpendicular line drawn from the point D intersects an optical path in the air leading to the point F, the optical path being parallel to an optical path in the air leading to the point D. A line segment DD' is a convergence of light which are emitted from the laser light source 1 to reach the object surface 6a and have an identical light optical path, the line segment DD' being represented as a wave surface DD'.

Here, in the wave surface DD', a distance which the light on the point D travels during the light on the point D' travels from the point D' to the point F is obtained. When the light on the point D' reaches the point F, the light on the point D has traveled from the point D to a point F' at which the perpendicular line drawn from the point F intersects a straight line DE.

In terms of the optical path length, it is possible to consider that an optical path length D'F which is required for the wave surface DD' to reach the point F after passing through the point D' is identical with an optical path length DF' which is required for the wave surface DD' to reach the point F' after passing through the point D since the lights travel the distances in an identical time length.

Next, since the refraction ratio of the test object 6 is n2, an optical path length F' EF which is required for the light reached the point F'to reach the point F after being reflected at the point E is obtained by the following equation 4:

$$F'EF = 2 \cdot n_2 \cdot t \cdot \cos\theta_2 \quad \text{Equation 4}$$

and a time T2 required for the light to travel the optical path length F'EF is obtained by the following equation 5 using the speed of light of c.

$$T2 = F'EF/c \quad \text{Equation 5}$$

Here, the following equation 6 holds.

$$\theta_2 = \sin^{-1}\left[\frac{1}{2}\sin\theta_1\right] \quad \text{Equation 6}$$

As described above, since the time required for the light to travel the optical path length D'F is equal to the time required for the light to travel the optical path length DF', the interference occurs when the inspection light is projected continuously for a time length longer than the time T2 which is required for the light to travel the optical path length F'EF. Therefore, the condition under which the interference fringes are formed by the reflected light caused by the inspection light being reflected from the object surface 6a and the reflected light caused by the inspection light being reflected from the rear face 6b is the continuous projection of the inspection light for the time T2 or longer. Accordingly, in order to prevent the formation of the rear face interference fringes IT, laser light having a pulse width shorter than the time T2 is projected to the object 6 (object surface 6a) via the prism 5 having the reference surface 5a.

As is the case with the surface interference, the optical path length F'EF can be represented also as an optical path difference between the optical path length DEF and the optical path length D'F or the optical path length DF'. Further, since the wave surface DD' is the convergence of the light beams which are emitted from the laser light source 1 and have the identical optical path length, the optical path length F'EF can be represented also as an optical path difference between the optical path length which is required for the wave surfaces of the light beams simultaneously emitted from the laser light source 1 and having the identical optical path length to reach the object surface 6a and an optical path length which is required for the wave surfaces to reach the object surface 6a after passing through the object surface 6a and being reflected from the rear face 6b; therefore, the time T2 means the time required for the light to travel the optical path difference.

By setting a pulse quiescent time from a completion of a projection of a laser pulse to a start of a next laser pulse projection to a value larger than the time T2, it is possible to prevent an interference caused by the following laser pulses. In addition, the pulse quiescent time must be shorter than a time length for one frame picked up by the CCD camera 9 in order to pick up the interference fringes per frame.

As described above, by stopping the projection of the inspection light before the inspection light travels the distance required for the rear face interference by taking advantage of the fact that the optical path difference required for the formation of the rear face interference fringes IT is larger than the optical path difference required for the formation of the surface interference fringes IS, it is possible to form only the surface interference fringes IS. Thus, a highly accurate inspection is achieved.

Next, a specific example of the pulse width and the pulse quiescent time of the pulsed laser light emitted from the laser light source 1 will be described. For instance, when the object 6 is made from a quartz glass and has a thickness t of 6.35 mm and a refraction ratio n2 of 1.457 with the following conditions: an incident angle θ1 to the object surface 6a is 71.555; an incident angle θ2 to the rear face 6b is 40.632; a distance WD from the reference surface 5a to the object surface 6a is 0.1 mm; and a speed of the light c is $3.0\times10^8$ m/s, the following equation 7 holds.

$A'A=0.063$ mm $T1 \cong 0.21 \cdot 10^{-12}$ sec $\cong 0.21$ p sec $F'EF=14.04$ mm $T2 \cong 46.8 \cdot 10^{-12}$ sec $\cong 47$ p sec   Equation 7

Thus, ultrashort pulsed laser light having a pulse width of picosecond level is emitted from the laser light source 1. The pulse width is longer than 0.21 picoseconds and shorter than 46.8 picoseconds. The pulse quiescent time is set to a value larger than 46.8 picoseconds. The pulse quiescent time must be shorter than the time length for one frame (1/30 s=33 ms) of the CCD camera 9.

Further, as other conditions, a repetition frequency of the laser pulse may preferably be 1 KHz or larger. A wavelength of the laser light may preferably be in the range of the visible portion to the near infrared portion which can be picked up by the CCD camera 9 and excellent in monochromaticity. For example, a laser light source wherein a second harmonic crystal is mounted on ND: YVO4, which is capable of outputting a repetition frequency of MHz level at a wavelength of 532 nm may be used.

As described above, when the formation of the rear face interference fringes IT is prevented, it is possible to pick up only the surface interference fringes IS using the CCD camera 9, thereby enabling to quantitatively calculate a shape of the surface (object surface) 6a of the object 6 by a known phase shift method based on the surface interference fringes IS. For example, with the phase shift method, by finely moving the prism 5 or the mounting table 13 by driving and controlling a piezo element (not shown) using the controller 11, it is possible to finely changing the distance between the reference surface 5a and the object surface 6a. A plurality of interference fringes having different phases in accordance with the distance change are picked up by the CCD camera 9 to be stored in a memory 15. The arithmetic analysis device 10 calculates the shape of the object surface 6a by the phase shift method based on the stored interference fringes. The calculation result of the shape of the object surface 6a obtained by the arithmetic analysis device 10 is displayed on the monitor 14 as a top view or a sectional view.

In addition, though the grazing-incident interferometer which projects the inspection light orthogonally to the object is described in the above-described embodiment, this invention is applicable also to a normal-incidence interferometer which projects an inspection light perpendicularly to the object.

What is claimed is:

1. A surface inspection apparatus for inspecting a surface of an object to be inspected, comprising:
    a projecting optical system which projects an inspection light to the surface of the object via a reference surface;
    a pick up unit which picks up surface interference fringes formed by reflected light caused by the inspection light being reflected from the reference surface and reflected light caused by the inspection light being reflected from the surface of the object; and
    an arithmetic unit which calculates a shape of the surface of the object based on the picked up interference fringes,
    wherein the projecting optical system includes a laser light source that emits, as the inspection light, pulsed laser light having a pulse width and a pulse quiescent time capable of preventing formation of rear face interference fringes which are formed by the reflected light from the surface of the object and reflected light caused by the inspection light being reflected from a rear face of the object, the object allowing the inspection light to pass therethrough.

2. The surface inspection apparatus according to claim 1, wherein
    the light emitted from the laser light source is reflected from the reference surface, the surface of the object, and the rear face of the object; and
    the pulse width has a time length longer than a time T1 during which the inspection light travels an optical path difference which is made between the reflected light from the reference surface and the reflected light from the surface of the object when the reflected light forms the interference fringes and shorter than a time T2 during which the inspection light travels an optical path difference which is made between the reflected light from the surface of the object and the reflected light from the object rear face of the object when the reflected light forms the interference fringes.

3. The surface inspection apparatus according to claim 2, wherein the pulse quiescent time is longer than the time T2 and shorter than a time length for one frame picked up by the pick up unit.

4. A surface inspection apparatus for inspecting a surface of an object to be inspected, comprising:
    a laser light source which projects inspection pulsed laser light to the surface of the object via a reference surface, wherein the laser light is emitted from the laser light source to be reflected from the reference surface, the surface of the object and a rear face of the object and has a pulse width longer than a time T1 during which the laser light travels an optical path difference which is made between the reflected light from the reference surface and the reflected light from the surface of the object when the reflected lights form interference fringes and shorter than a time T2 during which the laser light travels an optical path difference which is made between the reflected light from the surface of the object and the reflected light form the rear face of the object when the reflected lights form interference fringes;
    a pick up unit which picks up the interference fringes formed by the reflected light from the reference surface and the reflected light from the surface of the object; and
    an arithmetic unit which calculates a shape of the surface of the object based on the picked up interference fringes.

5. The surface inspection apparatus according to claim 4, wherein the laser light has a pulse quiescent time longer than the time T2 and shorter than a time length for one frame picked up by the pick up unit.

* * * * *